Sept. 26, 1950 G. GILLIVER 2,523,291
ELECTRIC WELDING FIXTURE
Filed Jan. 2, 1947

INVENTOR
GILBERT GILLIVER
BY RP Morris
ATTORNEY

Patented Sept. 26, 1950

2,523,291

UNITED STATES PATENT OFFICE 2,523,291

ELECTRIC WELDING FIXTURE

Gilbert Gilliver, London, England, assignor to International Standard Electric Corporation, New York, N. Y., a corporation of Delaware Application January 2, 1947, Serial No. 719,731
In Great Britain September 5, 1945

1 Claim. (Cl. 219—17)

This invention relates to methods of attaching small beads, tips or the like of metal having a high melting point to metal objects also having high melting points which may, however, differ substantially from the melting points of the metal beads, tips or the like to be connected thereto, and to objects so produced.

One such problem is the connection of iridium tips to gold fountain pen nib blanks for which an intimate connection without cracks or free edges is essential. Up to the present the job has been carried out by blowlamp, and it is thought that the effect is for the iridium bead to sink into the softened gold, the melting point of which is 1,060° C. as compared with 2,260° C. for iridium.

It has been found that a satisfactory connection can be obtained by a momentary weld by means for instance of condenser discharge welding equipment of the type described and claimed in British Specification No. 570,681.

It has also been found that contact tips of silver and the like and that beads of platinum, silver, and other metals and alloys used for the purpose, to the plane surfaces of contact springs such as are used on electromagnetic relays and switches can be fixed to the ends of contact studs by the same technique.

The invention will be particularly described with reference to certain typical embodiments shown in the accompanying drawings in which:

Figs. 3 and 4 show in elevation an electrical contact stud with a contact pin respectively in position for attachment, and attached, while

Figure 1:
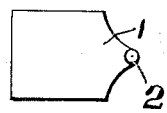
Fig. 1 shows in plan and side views a fountain pen nib blank with an iridium or like bead in position for tipping the blank.
Figure 2:
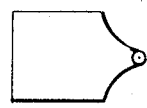
Fig. 2 shows in plan and side views the fountain pen nib blank of Fig. 1 with tip attached.
Figure 1A:
Figure 2A:

Referring first to Figs. 1 and 2, the gold blank 1 is connected to one side of the condenser discharge welding equipment of the type described in Specification No. 570,681 and the pellet 2 of material to be fused on to the blank 1; for example, iridium; is placed in the desired position and the electrode on the other side of the power supply is touched on to the pellet 2.

The discharge taking place instantly fuses the two metals into a bead, as shown in Fig. 2.

Figure 3:
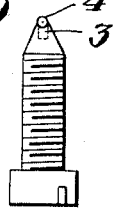
Figure 4:

In tipping contact studs or screws, the screw is suitably shaped, as shown in Fig. 3, and preferably a small hole 3 is drilled into the end of same. A pellet 4 or piece of wire is inserted into this and the fusing process is carried out as in the case of the pen nib.

In the same way a pellet or piece of wire can be attached to the plane surface of a contact spring such as is used in telephone type electromagnetic relays and switches.

Figure 5:
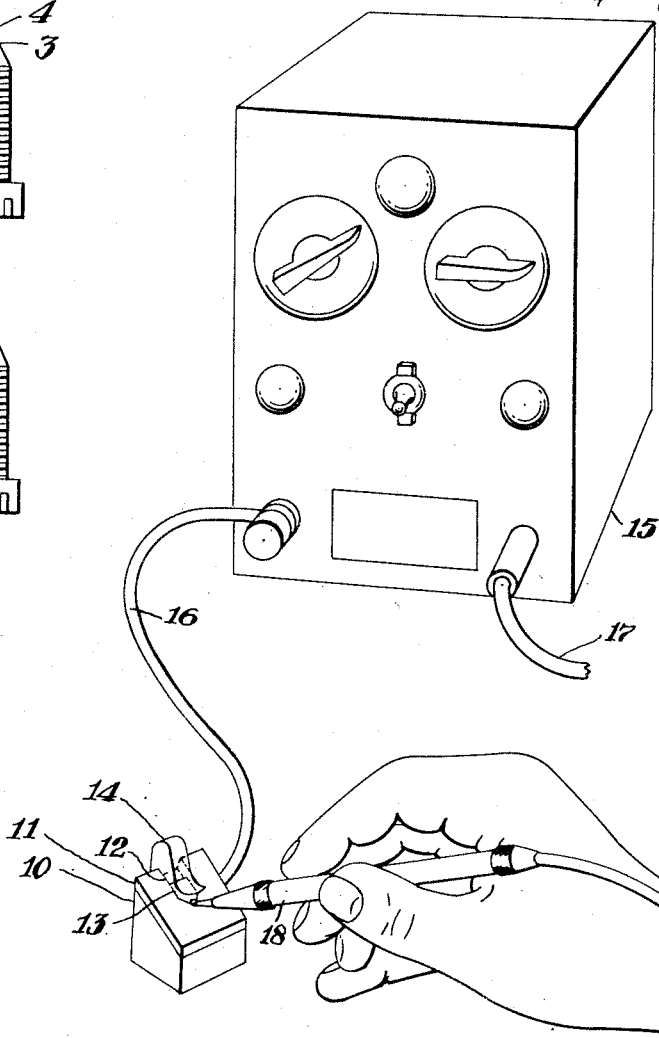
Fig. 5 shows the fixture and welding equipment for welding a bead to a fountain pen nib blank.

Fig. 5 shows a fixture for welding a bead to a pen nib blank consisting of a copper stand 10 carrying a ceramic or like insulating plate 11 on its sloped top. The ceramic plate is cut away at 12 to the shape of a nib blank, so that a blank 13 placed in the recess rests on the copper. A spring clip 14 fixed to the back of the stand 10 holds the blank firmly against the copper. An iridium or like bead is placed on the tip of the blank in the recess.

Condenser discharge welding equipment 15 has one lead 16 connected to the copper stand which has facilities for their connection while the other lead 17 terminates in a pencil-type electrode 18. When the electrode is placed against the bead, the discharge welds the bead to the blank.

What is claimed is:

The fixture for electrically welding a bead tip to a metal article comprising a metal stand, an electrically non-conducting top portion secured to said stand having a recessed portion therein substantially conforming to the said metal article and inclined to receive said bead tip, a metallic spring member forming a connection between said metal stand and a metal article to be placed in said recessed portion for fixedly holding said article therein, and means forming an electric conductor from said metal stand to a source of electric current.

GILBERT GILLIVER.

REFERENCES CITED

The following references are of record in the file of this patent:

UNITED STATES PATENTS

| Number | Name | Date |
|---|---|---|
| 1,972,529 | Longoria | Sept. 4, 1934 |
| 2,141,288 | Bouchard | Dec. 27, 1938 |
| 2,145,651 | Funk | Jan. 31, 1939 |
| 2,223,730 | Ledig | Dec. 3, 1940 |
| 2,401,176 | Muller | May 28, 1946 |
| 2,411,548 | Laico | Nov. 26, 1946 |

FOREIGN PATENTS

| Number | Country | Date |
|---|---|---|
| 553,032 | Great Britain | May 5, 1943 |
| 570,681 | Great Britain | July 18, 1945 |